(12) United States Patent
Froehlich et al.

(10) Patent No.: US 7,190,465 B2
(45) Date of Patent: Mar. 13, 2007

(54) LASER MEASUREMENT SYSTEM

(75) Inventors: Christoph Froehlich, Wangen im Allgaeu (DE); Markus Mettenleiter, Eisenharz (DE); Martin Zebandt, Roethenbach (DE)

(73) Assignee: Z + F Zoller & Froehlich GmbH, Wangen im Allgaeu (DE)

( * ) Notice: Subject to any disclaimer, the term of this patent is extended or adjusted under 35 U.S.C. 154(b) by 328 days.

(21) Appl. No.: 10/228,600

(22) Filed: Aug. 27, 2002

(65) Prior Publication Data

US 2003/0043386 A1 Mar. 6, 2003

(30) Foreign Application Priority Data

| Aug. 30, 2001 | (DE) | ................................ 101 42 313 |
| Oct. 12, 2001 | (DE) | ................................ 101 50 436 |
| May 23, 2002 | (DE) | ........................... 202 08 077 U |

(51) Int. Cl.
*G01D 11/24* (2006.01)

(52) U.S. Cl. ...................................... 356/601

(58) Field of Classification Search ............... 356/601, 356/602, 603, 604, 605, 606, 607, 608, 609, 356/610, 611, 612, 613; 382/154; 250/559.19, 250/559.22, 559.23, 559.24
See application file for complete search history.

(56) References Cited

U.S. PATENT DOCUMENTS

| 4,311,915 | A | * | 1/1982 | Stratton ................. 250/559.24 |
| 4,322,327 | A | * | 3/1982 | Yoshimura et al. ......... 524/507 |
| 4,567,347 | A | * | 1/1986 | Ito et al. ..................... 356/3.01 |
| 4,622,462 | A | * | 11/1986 | Eaton et al. ................ 356/602 |
| 4,630,070 | A | | 12/1986 | Sato |
| 4,709,156 | A | * | 11/1987 | Murphy et al. ........ 250/559.22 |
| 4,714,339 | A | * | 12/1987 | Lau et al. .................. 356/4.09 |
| 4,790,660 | A | * | 12/1988 | Ito et al. ..................... 356/607 |
| 4,996,440 | A | * | 2/1991 | Nordbryhn ............. 250/559.24 |
| 5,082,362 | A | * | 1/1992 | Schneiter ................... 356/3.03 |
| 5,179,271 | A | * | 1/1993 | Lindacher et al. ..... 235/462.22 |
| 5,455,669 | A | * | 10/1995 | Wetteborn ................. 356/5.01 |
| 5,625,447 | A | * | 4/1997 | Kikuchi et al. ............ 356/4.01 |
| 5,636,030 | A | * | 6/1997 | Limbach .................... 356/612 |
| 5,710,417 | A | * | 1/1998 | Joseph et al. .......... 235/462.11 |
| 5,956,661 | A | * | 9/1999 | Lefebvre et al. ............ 356/614 |
| 6,034,803 | A | * | 3/2000 | Sullivan et al. ............. 359/196 |

(Continued)

FOREIGN PATENT DOCUMENTS

| DE | 3720225 | 12/1988 |

(Continued)

OTHER PUBLICATIONS

AccuRange Line Scanner by Acuity Research (Brochure), publication date unknown (AccuRange Line Scanner is known prior art since 1995).*

(Continued)

*Primary Examiner*—Layla G. Lauchman
*Assistant Examiner*—Juan D Valentin
(74) *Attorney, Agent, or Firm*—Oliff & Berridge, PLC

(57) ABSTRACT

What is disclosed is a 3-D laser measurement system, including a mirror continuously rotatable about a rotation axis which extends, e.g., in parallel or coaxial with a measuring beam emitted by an optical emitter and impinging on the mirror.

16 Claims, 3 Drawing Sheets

U.S. PATENT DOCUMENTS

| | | | |
|---|---|---|---|
| 6,421,132 B1 * | 7/2002 | Brajovic | 356/602 |
| 6,441,908 B1 * | 8/2002 | Johnston et al. | 356/602 |
| 6,556,598 B1 * | 4/2003 | Angott | 372/9 |

FOREIGN PATENT DOCUMENTS

| | | |
|---|---|---|
| DE | 4222659 | 1/1994 |
| DE | 4222659 A1 * | 1/1994 |
| DE | 44 45 464 A1 | 7/1995 |
| DE | 4415419 | 11/1995 |
| DE | 4434042 | 3/1996 |
| DE | 19543299 | 5/1997 |
| DE | 198 60 015 A1 | 7/2000 |
| DE | 101 50 436 A1 | 3/2003 |
| EP | 0 525 500 A1 * | 3/1993 |

OTHER PUBLICATIONS

Acuity Research, "Line Scanner Enclosure AR4000 and Line Scanner in Nema-4 Enclosure", Publication Date Unknown, [retreived on Mar. 6, 2006]. Retrieved from http://www.acuityresearch.com/products/line-scanner/options-accessories-pop-up.shtml.*

The Industrial Physicist, New Products Mar. 1998, American Institute of Physics [retrieved on Mar. 6, 2006]. Retrieved from http://www.tipmagazine.com/tip/INPHFA/vol-4/iss-1/p55.pdf.*

Neimeier et al.: Anwendungspotentiale von scannenden Meßverfahren, in: Weferling, U., Heine, K., Wulf, U. (Hrsg.): Von Handaufmaß bis High Tech;InterdisziplinäRES Kolloquium vom 23.-26. Feb. 2000 in Cottbus, Verlag Philipp.von Zabern, Mainz am Rhein, 2001, S.: 134-140 u. Anhang VII. Retrieved from http://www.xdesy.de/paper/scannerCOTTBUS2000.pdf.*

Adams, "Sensor Modeling, Design and Data Processing for Autonomous Navigation," [electronic version provided by author] Chapter 4.2, pp. 81-88, European Semiconductor Equipment Centre, Cham Switzerland, Oct. 18, 1998.

Bares et al., "Dante II: technical description, results, and lessons learned" [online], Int'l. J. Robotics Research 18(7): 621-49; Jul. 1999 [retrieved on Jun. 9, 2005]. Retrieved from http://www.ri.cmu.edu/pub_files/pub2/bares_john_1999_1/bares_john_1999_1.pdf.

Bergqvist, Undated Letter Regarding "LADAR 2D OWS 6" with attached photograph of "LADAR 2D OWS 6," Publication Date Unknown.

Borenstein et al., "Where Am I? Sensors and Methods for Mobile Robot Positioning" [online], Chapter 4, pp. 95-128, University of Michigan, Apr. 1996 [retrieved on Jun. 8, 2005]. Retrieved from http://www-personal.umich.edu/~johannb/shared/pos96rep.pdf.

Ibeo, "LADAR 2D Specification Sheet" [online], Publication Date Unknown [retrieved on Jun. 21, 2005]. Retrieved from http://www.ats.se/pdf/pr_1d_ows.pdf.

Ibeo, "LADAR 3D User's Manual," Copyright 1995.

Kweon et al., "Experimental Characterization of the Perceptron Laser Rangefinder," CMU-RI-TR-91-1, 1991.

Nickerson et al., "An autonomous mobile robot for known industrial environments" [online], 1997 [retrieved on Jun. 30, 2005]. Retrieved from http://users.cs.dal.ca/~eem/res/pubs/pubs/arkjournal.pdf.

Nyland, "Capturing Dense Environmental Range Information with a Panning, Scanning Laser Rangefinder" [online], 1998 [retrieved on Oct. 26, 2005]. Retrieved from http://www.cs.unc.edu/~ibr/projects/rangefinder/how_it_works/paper.html.

Rozmann et al., "Environmental Exploration Based on a Three-Dimensional Imaging Radar Sensor," Proceedings of the 1992 IEEE/RSJ International Conference on Intelligent Robots and Systems, Raleigh, NC, pp. 422-429, 1992.

Singh et al., "Cyclone: A Laser Scanner for Mobile Robot Navigation," CMU-RI-TR-91-18, 1991.

Wettergreen et al., "Exploring Mount Erebus by Walking Robot" [online], Robotics and Autonomous Systems, 1993 [retrieved on Jul. 8, 2005]. Retrieved from http://www.ri.cmu.edu/pub_files/pub2/wettergreen_david_1993_1/wettergreen_david_1993_1.pdf.

Wissler et al., "3D Imaging Scanner for the Inspection of Tunnels," Automated 2D and 3D Vision , vol. 2249, pp. 96-106 1994.

Thorlabs, Printout of website pages relating to "Single Mode FC/APC Patch Cables," Publication Date Unknown [apparent retrieval date Jun. 15, 2005].

Decision in German Patent and Trademark Office Utility Model Cancellation Proceedings Relating to Utility Model 202 08 077, Feb. 4, 2005 (w/ translation).

Grounds for Appeal of Decision in German Patent and Trademark Office Utility Model Cancellation Proceedings Relating to Utility Model 202 08 077, Jun. 21, 2005 (w/ partial translation).

DeltaSphere-3000 Laser 3D Scene Digitizer, www.3$^{rd}$ tech.com/Delta Sphere.htm, Oct. 24 2001.

AccuRange 4000 User's Manual, by Acuity Research Incorporated, Jan. 25, 2000, pp. 1-3, 40, 58-59.

"Capturing Dense Environmental Range Information with a Panning, Scanning Laser Rangefinder" by Lars S. Nyland, http://www.cs.unc.edu/~ibr/projects/rangefinder/how_it_works/paper.html, Feb. 19, 1999.

Data sheet of AccuRange 4000 by Acuity Research Inc., 1999.

Data sheet of AR 600 Series by Acuity Research Inc., 1999.

* cited by examiner

LASER MEASUREMENT SYSTEM

FIELD OF THE INVENTION

The preferred embodiment is directed to laser measurement systems and more particularly, a 3-D laser measurement system employing an efficiently designed deflection mechanism.

DESCRIPTION OF RELATED ART

In a like measurement system, the laser measuring beam emitted by an optical emitter is deflected by a mechanical beam deflection system in such a way that full-surface, three-dimensional spatial scanning or measurement of a surrounding is made possible. The digitized measurement data is stored on a computer system, to there be available for further processing and for visualization of the object under measurement.

3-D measurement is carried out by passing the modulated laser light across the environment to be measured, wherein point measurement of both the distance and reflectivity values is possible for different directions in space. Distance and reflectivity images result from the organization of all measured directions in space. The distance images reproduce the geometry of the surrounding, while the reflectivity images reproduce the visual image thereof in analogy with the halftone pictures of a video camera. Both images correspond pixel by pixel and are largely independent of environmental influences due to the autonomous, active illumination with laser light.

Spatial beam deflection or scanning in such a measurement system is effected by the mentioned mechanical deflection unit as known, e.g., from U.S. Pat. No. 6,034,803 A1. This beam deflection system includes a mirror whereby a laser measuring beam emitted by an emitter is directed at an object. The mirror is mounted to be rotatable through 360° about a rotation axis arranged coaxial or parallel with the emitter's measuring beam axis. The exit angle of the measuring beam is adjustable with the aid of a pivoting mechanism whereby the angle of inclination of the mirror may be changed relative to the measuring beam axis. In the known solution, the rotation axis of the mirror is mounted on a yoke and carries at an end section a gear meshing which a toothed rack which is supported on a cam via a cam follower wheel. This cam is designed such that in the course of the mentioned rotation of the mirror, the angle of inclination is changed so that the surrounding space may be scanned. In order to make sure that the cam follower wheel of the toothed rack is reliably supported on the cam during the rotation, the rotation axis is subjected to the influence of counterweights so that the toothed rack is biased in a direction towards the cam.

Owing to the multiplicity of moved elements (cam follower wheel, counterweights, toothed rack, gear), such a deflection unit has a very complex mechanical structure with a great mass. An additional drawback resides in that the visual range is restricted in the vertical direction.

From EP 1 001 251 A1 a laser positioning system is known, wherein the mechanical deflection unit comprises two rotatably mounted mirrors each having a motor operator associated thereto. By suitably driving these mirrors it is also possible to perform 3-D measurement. In this variant, too, considerable expense in terms of device technology is necessary for spatial deflection of the measuring beam.

In view of the above, the field of laser measurement systems was in need of a 3-D laser measurement system providing for three-dimensional scanning of objects to be measured, at reduced expense in terms of device technology.

SUMMARY OF THE PRESENT INVENTION

The measurement system of the invention includes a rotatable mirror having its rotation axis arranged, e.g., in parallel or coaxial with the beam axis of the measuring beam impinging on the mirror. The mount of the mirror is selected such that the latter is continuously rotatable and that a full circle (360°) may be scanned during one rotation of the mirror about its rotation axis. Scanning is thus performed in columns—e.g. in a vertical direction, whereas in the solution known from U.S. Pat. No. 6,034,803 A, scanning is performed in lines. Continuous rotation of the mirror is controllable with much more ease than the reciprocating movement of the solution known from U.S. Pat. No. 6,034,803 A. In the solution known from EP 1 001 251 A1, at least two mirrors each having a drive mechanism are necessary, with control equally necessitating substantially greater expenditure.

The rotary head including the mirror and the associated drive mechanism is mounted in a measuring head which in turn is pivotable about a rotation axis preferably extending perpendicularly to the rotation axis of the rotary head. The angle of rotation or pivoting of the measuring head may be restricted to 180°, so as a result of the rotation of the mirror and pivoting the measuring head through 180°, complete 3-D scanning (360°) is possible. In the reference prior art, a rotation of the measuring head through 360° is necessary in order to scan approximately the same range as in the apparatus of the invention.

In a particularly preferred variant of a measurement system for measuring three-dimensional objects, the mirror is mounted in a rotary head whose angular position may be detected with the aid of an encoder. The rotary head accommodating the mirror is continuously rotatable with the aid of a dedicated rotational drive mechanism. The drive mechanism for the rotary head and the drive mechanism for the mirror are controllable independently of each other, so that it is possible through suitable control to increase the data density in areas of interest while decreasing it in areas of less interest.

It is particularly advantageous if in this embodiment a rotating exit window of the rotary head is formed by a disk which is coated so as to avoid reflections. In order to avoid diffuse reflections, this disk may be provided with a corresponding optical insert. It was found to be of particular advantage if the disk is inclined so as to minimize reflections.

The mount of the rotary head is particularly simple if the measuring head is designed to include two support legs having the rotary head arranged between them. The bearing elements and the drive mechanism of the rotary head, the optical emitter, the receiver and the associated control mechanism may then be integrated into one or both support legs.

Further advantageous developments of the invention are subject matters of the further subclaims.

BRIEF DESCRIPTION OF THE DRAWINGS

A preferred embodiment of the invention shall be explained in more detail hereinbelow by referring to schematic drawings, wherein.

DETAILED DESCRIPTION OF THE PREFERRED EMBODIMENT

Figure 1:
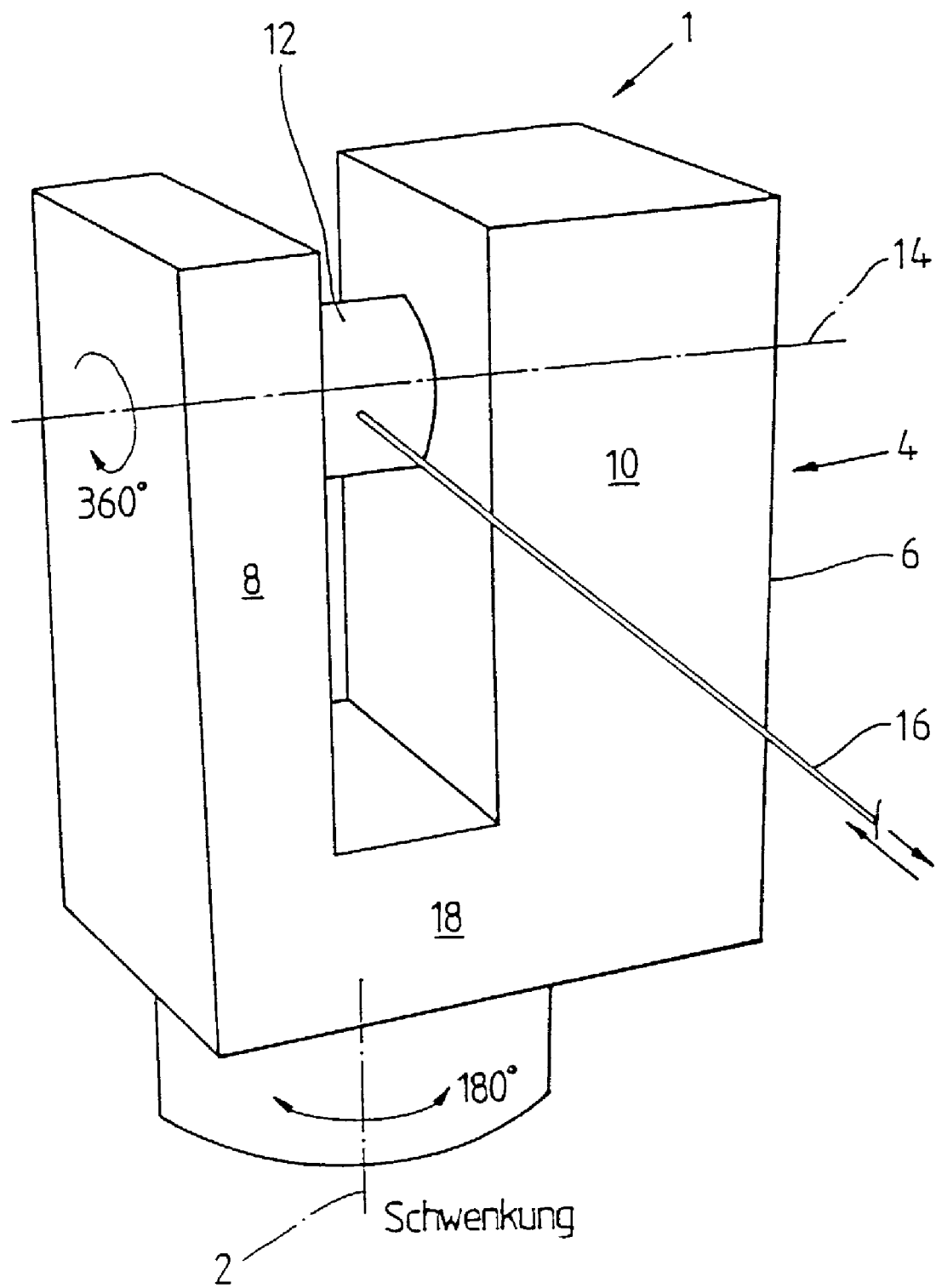
FIG. 1 shows a schematic representation of a 3-D laser measurement system according to the invention.

FIG. 1 is a schematic representation of a 3-D laser measurement system including a measuring head 4 that is pivotable about a vertical rotation axis 2. This measuring head comprises a housing 6 with two support legs 8, 10 having mounted therein a rotary head 12 which is continuously rotatable about a rotation axis 14 having a horizontal orientation in the representation according to FIG. 1. The rotary head 12 furthermore includes an optical system—to be described more closely in the following—through which a laser measuring beam may be directed at an object.

As a result of the rotatable mount of the rotary head 12, this measuring beam 16 rotates about the rotation axis 14, so that in effect a vertical plane is scanned. The laser light reflected by the object is then admitted through the rotary head 12, deflected, and evaluated by an evaluation unit including an optical receiver, wherein it is possible to deduct the propagation delay of the laser light and thus the distance of the object from the measuring head 4 based on the phase shift between the transmitted signal (measuring beam 16) and the scattered light detected via the receiver, whereas the amplitude of the detected scattered light corresponds to the intensity value and depends on the reflectivity and the distance of the object being measured. It is thus possible to represent distance images as halftone pictures, with a corresponding halftone being allocated to each distance value. The intensity images, too, may be represented as halftone pictures, with dark (low reflectivity) surfaces appearing black, and bright (high reflectivity) surfaces appearing white. This kind of halftone encoding is very familiar to the human eye and makes on-site assessment of recorded laser data relatively simple without any sophisticated data processing. Other than the distance values, the intensity value of an object depends on numerous factors such as, e.g., reflectivity of the surface (proportion of backscattered laser energy), the distance of the object, and the angle of incidence of the laser beam. As regards the highly complex processing of the signal reflected by the object and detected by the measuring head, reference is made to the Applicant's German patent application DE 198 51 307 A1.

Figure 2:
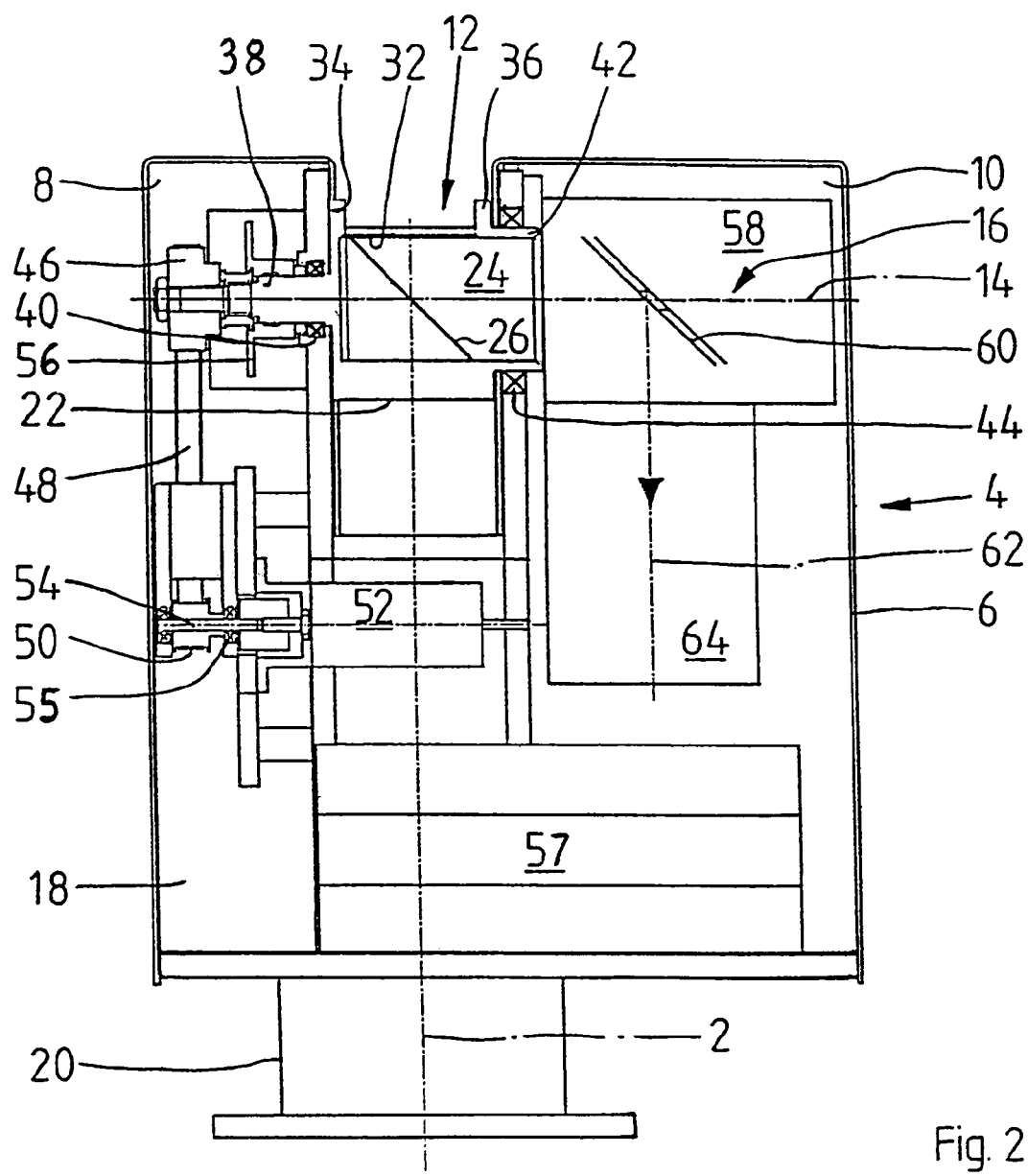
FIG. 2 is a sectional view of the 3-D laser measurement system represented in FIG. 1.

FIG. 2 shows a sectional view of the measuring head 4. As was already mentioned earlier on, the housing 4 forms a support leg 8 and a support leg 10 wherein the rotatable rotary head 12 is mounted. The two support legs 8, 10 continue downwardly (view of FIG. 2) into a base 18 which is fasted on a rotary flange 20. This rotary flange 20 is adapted to be coupled to a pivotal drive not represented here, so that the represented measuring head 4 is pivotable about the rotation axis 2. The rotary head 12 includes a housing jacket 22 whereby an approximately cylindrical internal cavity 24 accommodating an obliquely inclined mirror 26 is encompassed.

Figure 3:
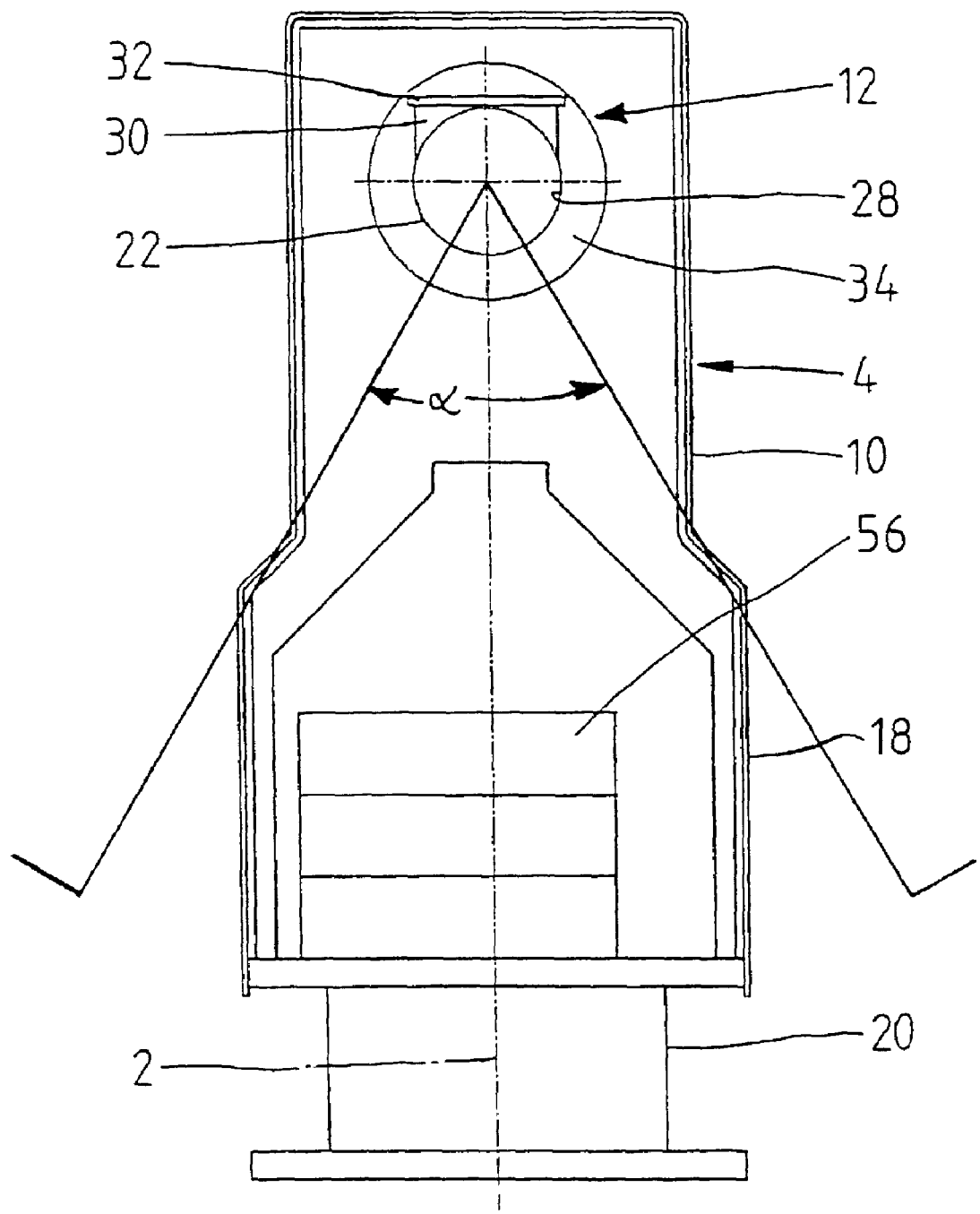
FIG. 3 is a sectional lateral view of the 3-D laser measurement system of FIG. 1.

As can in particular be taken from FIG. 3 showing a lateral view from the right of the representation of FIG. 2, the housing jacket 22 comprises an approximately cylindrical section 28 encompassing the internal cavity 24, on which a shaft 30 is placed. The latter supports a non-reflecting disk 32, with the geometry of the shaft 30 being selected such that the disk 32 extends tangentially relative to the section 28.

The disk 32 is preferably inclined by a specific angle with the vertical on the plane of drawing in FIG. 2. This angle is about 10°, for instance.

In order to avoid undesirable diffuse reflections, an insert precluding such reflections may be formed on the disk 32.

On the housing jacket 22 of the rotary head 12 two flange-type protrusions 34, 36 are formed between which the disk 32 and the shaft 30 extend. At the external end face of the left protrusion 34 (FIG. 2), a drive shaft 38 is formed which is mounted through the intermediary of a mount 40 in the support leg 8. This mount 40 may have the form of a radial and axial bearing. In principle, axial guidance might equally be provided by supporting the protrusions 34, 36 on the adjacent lateral walls of the support legs 8, 10.

On the protrusion 36 remote from the drive shaft 38, a hub 42 is formed which is mounted in support leg 10 of the housing 6 through the intermediary of a bearing 44.

On the freely projecting end section of the drive shaft 38, a drive pinion 46 is fastened which is connected with an output pinion 50 of a rotational drive mechanism 52 by means of a belt 48. This drive mechanism comprises an output shaft 54 carrying the output pinion and mounted in the base 18 of the housing 6 through the intermediary of bearing 55. The rotational angle position of the rotary head 12 is detected by means of a shaft encoder 56 placed on the drive shaft 38. Control of the rotational drive mechanism 52 is effected with the aid of a control unit 57 received in the base 18 of the housing 6. As can be taken from the representation in accordance with FIG. 2, the comparatively heavy rotational drive mechanism 52 with its drive motor is positioned approximately in the rotation axis 2, 50 that the mass moment of inertia and possible eccentricities of the entire measuring head 4 relative to the rotation axis 2 are minimum. The rotary drive of the measuring head 4 and of the rotational drive mechanism 52 of the rotary head 12 are controllable independently of each other.

Inside the support leg 10 represented on the right in FIG. 2 an optical emitter 58 is received, whereby laser light of a comparatively low power of several milliwatts is emitted. The laser beam emitted by the emitter 58 is oriented to be substantially coaxial with the rotation axis 14 and exits—through deflection means 60 acting solely on the detected scattered light—into the unilaterally open internal cavity 24 of the rotary head 12, impinges on the mirror 26 to be reflected thereby towards the disk 32, so that a measuring beam exits from the rotary head 12. The exit angle of this measuring beam relative to the rotation axis 2 is predetermined by the rotational angle position of the mirror 26.

In the represented embodiment, the fixed deflection means 60 is formed by a mirror including a bore which permits the measuring beam emitted by the optical emitter to pass through in a direction towards the rotatably mounted mirror 26.

The beam reflected by the object enters through the disk 32 into the internal cavity 24, is deflected by 90° by the mirror 26 and directed onto the deflection means 60. The beam 62 reflected by the deflection means 60 is then detected with the aid of an optical receiver (APD) 64, evaluated with the aid of the electronic control and evaluation unit 56, and the distance and intensity values described at the outset are determined and processed for visualization of the intensity images. In the course of one rotation of the rotary head 12, a vertically (view according to FIG. 2) oriented plane of the object to be surveyed is scanned by the turning laser beam. The complete 3-D scan is then achieved through pivoting the entire measuring head about the rotation axis 2, with the result of a nearly complete image of the object, for instance of a tunnel or space having the 3-D laser measurement system positioned in it, being available following a rotation of the measuring head by 180°. What is not scannable in the above described system is the range covered by the measuring head 4 as indicated by the angle α in FIG. 3.

Owing to the measurement principle implying a pivoting movement of the measuring head 4 about the rotation axis 2 as well as a rotation of the rotary head 12 comprising the mirror 26 about the rotation axis 14, the maximum data density will be present in the intersection of the planes scanned through rotation of the mirror 26, i.e., in the zone of the intersection of the rotation axis 2 with the object to be measured. As the drive mechanisms for the measuring head and the rotary head may be driven independently of each other, it is possible to scan specific windows with the system of the invention, with the uncoupled drives furthermore allowing for control of data density in the range of interest.

The variant represented in FIGS. 2 and 3 may be used for measuring bodies, free shapes, structures, monuments, canals, or for conducting unmanned transport systems in inaccessible areas (nuclear power plant, etc.). In a simplified version, the rotation axis 2 may be omitted while arranging the measuring head 4 on a carriage or wagon displaceable in parallel with the rotation axis 14. Such solution including a rotary head 4 designed without a rotation axis 2 may, for example, be used for measuring tunnel cavities, in which case the measuring head 4 is fastened on a measuring carriage passing through the tunnel. This case, depending on the moving velocity of the measuring carriage, would result in approximately helical scanning of the tunnel cavity.

The solution according to the invention is characterized by an extremely compact shape having a very simple structure, wherein the continuous rotation of the rotary head 12 accommodating the mirror 26 may be controlled through a suitable motor operator with extreme precision and independently of driving the measuring head, so that it is possible to satisfy even highest demands to measuring accuracy.

What is disclosed is a 3-D laser measurement system including a mirror continuously rotatable about a rotation axis which extends in parallel or coaxial with a measuring beam emitted by an optical emitter and impinging on the mirror.

What is claimed is:

1. A 3-D laser measurement system including an emitter for emitting a measuring beam, a receiver for processing the measuring beam after reflection by an object and a deflection apparatus that deflects the measuring beam emitted by the emitter for scanning the object, the deflection apparatus comprising:
    a rotatably mounted mirror for orienting the measuring beam, the mirror being mounted in a rotary head adapted to be rotated by a rotary drive mechanism, and being continuously rotatable about a rotation axis parallel to an axis of the measuring beam impinging on the mirror;
    wherein:
    the emitter, the receiver and the deflection apparatus are mounted in a measuring head that is rotatable about an axis of rotation that is substantially orthogonal to the rotation axis of the mirror;
    the rotary head (1) has a housing jacket with a substantially cylindrical, unilaterally open internal cavity in which the mirror is provided, (2) comprises a non-reflecting disk constituting an exit window, and (3) extends between two support legs of a housing;
    the non-reflecting disk is inclined with respect to the rotation axis of the mirror by a predetermined angle; and
    the measuring beam exits the system from the internal cavity of the rotary head.

2. The measurement system according to claim 1, wherein the system comprises a shaft encoder for detecting an angular position of the rotary head.

3. The measurement system according to claim 2, wherein the disk comprises an insert preventing diffuse reflection.

4. The measurement system according to claim 1, wherein the rotation axis of the mirror is a horizontal rotation axis.

5. The measurement system according to claim 1, wherein the measuring head is pivotable through about 180°.

6. The measurement system according to claim 1, wherein the rotary drive mechanism and a pivotal drive for rotating the measuring head can be driven independently of each other.

7. The measurement system according to claim 1, wherein:
    the rotation axis of the mirror is a horizontal rotation axis;
    the measuring head is pivotable through about 180° or less; and
    the rotary drive mechanism and a pivotal drive for pivotally driving the measuring head can be driven independently of each other.

8. A deflection apparatus for a 3-D laser measurement system that includes an emitter that produces a measuring beam, the deflection apparatus comprising:
    a measuring head;
    a mirror that directs the measuring beam;
    wherein:
    the mirror is mounted on the measuring head so that the mirror is continuously rotatable about a rotation axis of the measuring beam impinging on the mirror;
    the measuring head is rotatable about an axis of rotation that is substantially orthogonal to the rotation axis of the mirror; and
    the mirror is arranged in a rotary head including a non-reflecting disk constituting an exit window, the disk being inclined with respect to the rotation axis of the mirror by a predetermined angle.

9. The measurement system according to claim 1, wherein the angle is greater than 5°.

10. The measurement system according to claim 9, wherein the angle is about 10°.

11. The deflection apparatus of claim 8, wherein the rotary head extends between two support legs of a housing.

12. The deflection apparatus of claim 8, wherein the angle is greater than 5°.

13. The deflection apparatus of claim 12, wherein the angle is about 10°.

14. The deflection apparatus of claim 8, wherein the rotation axis of the mirror is arranged in a horizontal direction.

15. The deflection apparatus of claim 8, wherein the measuring head is pivotable through about 180°.

16. The deflection apparatus of claim 8, wherein the rotary head extends between two support legs of a housing.

* * * * *